US012797697B2

(12) United States Patent
Cleghorn et al.

(10) Patent No.: US 12,797,697 B2
(45) Date of Patent: Nov. 17, 2026

(54) GOLF CLUB HEAD

(71) Applicant: Acushnet Company, Fairhaven, MA (US)

(72) Inventors: Richard L. Cleghorn, Oceanside, CA (US); Kyle A. Carr, Carlsbad, CA (US); Daniel G. Chelius, Carlsbad, CA (US); Hiroshi Kawaguchi, Aliso Viejo, CA (US); Peter Larsen, San Marcos, CA (US); Doug M. Takehara, Oceanside, CA (US)

(73) Assignee: ACUSHNET COMPANY, Fairhaven, MA (US)

( * ) Notice: Subject to any disclaimer, the term of this patent is extended or adjusted under 35 U.S.C. 154(b) by 240 days.

(21) Appl. No.: 18/823,318

(22) Filed: Sep. 3, 2024

(65) Prior Publication Data

US 2026/0061265 A1 Mar. 5, 2026

(51) Int. Cl.

| | |
|---|---|
| ***A63B 53/04*** | (2015.01) |
| ***A63B 53/08*** | (2015.01) |
| ***B32B 15/14*** | (2006.01) |

(52) U.S. Cl.

CPC ...... *A63B 53/0466* (2013.01); *A63B 53/0458* (2020.08); *B32B 15/14* (2013.01); *A63B 53/0416* (2020.08); *A63B 53/0425* (2020.08); *A63B 53/0429* (2020.08); *A63B 2209/02* (2013.01); *B32B 2260/021* (2013.01); *B32B 2262/106* (2013.01); *B32B 2307/7376* (2023.05)

(58) Field of Classification Search

CPC ............ A63B 53/0425; A63B 53/0416; A63B 53/0466; A63B 53/0458; A63B 53/0408; A63B 53/042; A63B 53/0429; A63B 60/00; A63B 2209/02; A63B 2209/00; A63B 2209/023; B32B 15/14; B32B 2260/021; B32B 2262/106; B32B 2307/7376

See application file for complete search history.

(56) References Cited

U.S. PATENT DOCUMENTS

| | | | | |
|---|---|---|---|---|
| 6,299,547 | B1 * | 10/2001 | Kosmatka | A63B 53/0466 473/345 |
| 7,140,974 | B2 | 11/2006 | Chao et al. | |
| 7,628,712 | B2 * | 12/2009 | Chao | A63B 53/0466 473/348 |
| 8,221,261 | B2 | 7/2012 | Curtis et al. | |
| 2005/0239575 | A1 * | 10/2005 | Chao | A63B 53/047 473/345 |
| 2008/0146374 | A1 * | 6/2008 | Beach | A63B 60/00 473/350 |
| 2008/0234067 | A1 * | 9/2008 | Lo | A63B 53/047 473/350 |
| 2009/0005191 | A1 * | 1/2009 | Lin | A63B 53/0466 473/331 |

(Continued)

*Primary Examiner* — John E Simms, Jr.

(74) *Attorney, Agent, or Firm* — Womble Bond Dickinson (US) LLP

(57) ABSTRACT

A golf club head, includes a toe; a heel; a hosel disposed at the heel and configured to couple to a shaft; a multi-material striking face, including a first carbon fiber composite layer, a second carbon fiber composite layer, and a base layer between the first and second carbon fiber composite layers and including a different material than the first and second carbon fiber composite layers; and a sole forming a bottom portion of the golf club head.

20 Claims, 12 Drawing Sheets

(56) References Cited

U.S. PATENT DOCUMENTS

| | | | | |
|---|---|---|---|---|
| 2009/0088269 | A1* | 4/2009 | Beach | A63B 60/02 473/346 |
| 2012/0010019 | A1* | 1/2012 | Curtis | A63B 53/0466 473/345 |
| 2014/0323240 | A1* | 10/2014 | Myrhum | B21K 17/00 72/340 |

* cited by examiner

GOLF CLUB HEAD

BACKGROUND

This background section is provided only for purposes of introducing certain background material relating to the present disclosure and, thus, is not an admission of prior art.

A golf club head may include a striking face that is configured to strike a golf ball. It can be desirable to form the striking face with a thickness that varies across the striking face, which can spread out the so-called sweet spot on the striking face for striking the golf ball to a larger area. This can provide more forgiveness when the golf ball is struck away from the center of the striking face and can generally result in improved ball speed and launch conditions. It can also be advantageous to fabricate portions of a golf club with a carbon fiber composite material, which have a lower density than many metals while still having good mechanical strength. The reduction in mass from using carbon fiber composite material instead of a metal can reduce the total mass of the golf club head and/or allow mass to be strategically positioned elsewhere in the golf club head to selectively improve certain performance characteristics of the golf club head.

However, it can be challenging and expensive to form a suitable sheet of carbon fiber composite with variable thickness. This is because carbon fiber composite material includes long carbon fibers that provide its high mechanical strength. Machining down an initial piece of carbon fiber composite material to produce a variable thickness sheet can cause breaks in the carbon fibers and result in the destruction of the interlaminar sheer strength of the sheet.

It is in view of this technical background that the technology of the present disclosure is set forth.

SUMMARY

This Summary section introduces some features of non-limiting and non-exhaustive examples of the present disclosure, and is not intended to limit the scope of the claims.

According to an aspect, the technology relates to a golf club head, including: a toe; a heel; a hosel disposed at the heel and configured to couple to a shaft; a multi-material striking face, including: a first carbon fiber composite layer, a second carbon fiber composite layer, and a base layer between the first and second carbon fiber composite layers and including a different material than the first and second carbon fiber composite layers; and a sole forming a bottom portion of the golf club head.

In some examples, the golf club head is a metalwood type golf club head including a crown, and the base layer covers at least 50% of an area of overlap between the first and second carbon fiber composite layers. In some examples, a forward portion of the golf club head has an indent with a rearwardly offset ledge, and the first carbon fiber composite layer, the second carbon fiber composite layer, and the base layer define at least part of a striking face that is secured within the indent. In some examples, the base layer has a thickness, as measured along a direction normal to a front surface of the base layer, that is variable. In some examples, the first carbon fiber composite layer has a thickness, as measured along a direction normal to a front surface of the first carbon fiber composite layer, that is substantially uniform over the front surface of the first carbon fiber composite layer, and the second carbon fiber composite layer has a thickness, as measured along a direction normal to a front surface of the second carbon fiber composite layer, that is substantially uniform over the front surface of the second carbon fiber composite layer. In some examples, respective thicknesses of the first and second carbon fiber composite layers are substantially equal to each other. In some examples, the first carbon fiber composite layer, the base layer, and the second carbon fiber composite layer define at least part of a front cup that is secured to a rearward portion of the golf club head. In some examples, the first and second carbon fiber composite layers are joined together at a periphery of the base layer. In some examples, the hosel includes a first metal, the base layer includes a second metal having a lower density than the first metal, and the hosel is attached to the front cup. In some examples, the base layer and the hosel are monolithic and include a same metal material.

According to another aspect, the technology relates to a golf club head, including: a toe; a heel; a hosel disposed at the heel and configured to couple to a shaft; a striking face having a thickness, as measured along a direction normal to a front surface of the striking face, that is variable, the striking face including: a base layer including a metal, and a first carbon fiber composite layer on the base layer and having a thickness, as measured along a direction normal to a front surface of the first carbon fiber composite layer, that is substantially uniform; and a sole forming a bottom portion of the golf club head.

In some examples, the striking face further includes a second carbon fiber composite layer on an opposite side of the base layer from the first carbon fiber composite layer. In some examples, the base layer has a thickness, as measured along a direction normal to a front surface of the base layer, that is variable. In some examples, the base layer and the first carbon fiber composite layer define at least part of a front cup that is secured to a rearward portion of the golf club head, the rearward portion defining at least part of the sole. In some examples, the hosel is attached to the front cup by at least one of an adhesive or a fastener. In some examples, the base layer and the hosel include a same metal material and are joined to each other.

According to another aspect, the technology relates to a golf club head, including: a toe; a heel; a hosel disposed at the heel and configured to couple to a shaft; a multi-material striking face including: a base layer having a thickness, as measured along a direction normal to a front surface of the base layer, that is variable, and a first carbon fiber composite layer on a first surface of the base layer, the first carbon fiber composite layer and the base layer being different in material; and a sole forming a bottom portion of the golf club head.

In some examples, the striking face further includes a second carbon fiber composite layer on a second surface of the base layer. In some examples, a forward portion of the golf club head has an indent with a ledge rearwardly offset from an outer surface of forward portion, and the first carbon fiber composite layer and the base layer define at least part of a striking face insert that is positioned within the indent. In some examples, the hosel includes a metal body having an indent at a region of the hosel proximal to the sole, and the indent in the hosel is filled with a material having a lower density than the metal of the hosel.

BRIEF DESCRIPTION OF THE DRAWINGS

The drawings, together with the specification, illustrate nonlimiting and non-exhaustive examples of the present disclosure.

DETAILED DESCRIPTION

Figure 1:
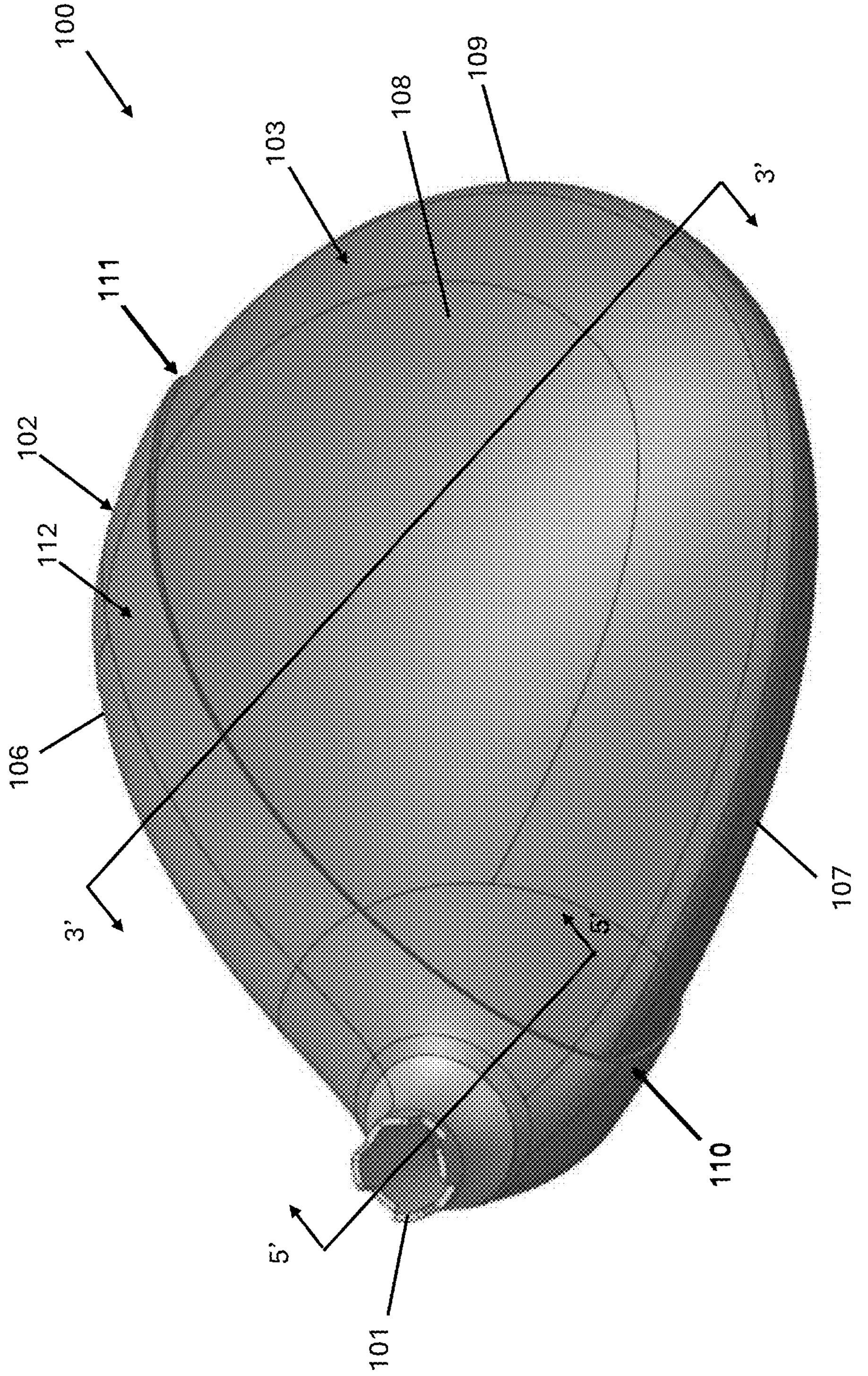
FIG. 1 depicts a heel, top-down perspective view of a golf club head according to some examples of the present disclosure.

Nonlimiting and non-exhaustive examples of golf club heads having striking faces with variable thickness and carbon fiber composite materials will now be described in more detail with reference to the drawings.

It will be understood that, although the terms "first", "second", "third", etc., may be used herein to describe various elements, components, processes, or other features, these elements, components, processes, or features should not be limited by these terms. These terms are only used to distinguish one element, component, process, or feature from another element, component, process, or feature. Thus, a first element, component, process, or feature discussed herein could be termed a second element, component, process, or feature, without departing from the spirit and scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure." Also, the term "exemplary" is intended to refer to an example or illustration.

It will be understood that when an element or layer is referred to as being "on", "connected to", "coupled to", "attached to", or "adjacent to" another element, it can be directly on, connected to, coupled to, attached to, or adjacent to the other element, or one or more intervening element(s) may be present. In contrast, when an element is referred to as being "directly on," "directly connected to", "directly coupled to", "directly attached to", or "immediately adjacent to" another element, there are no intervening elements present. Similar terms and phrases should be understood in a similar manner to encompass both direct and indirect affiliations between two or more elements being discussed. In addition, it will also be understood that when an element is referred to as being "between" two elements or layers, it can be the only element between the elements, or one or more intervening elements may also be present.

As used herein, the phrase "at least part" includes part or all of the stated item, the phrase "at least partly" includes the stated item partly or entirely, and similar phrases should be interpreted in a similar manner.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 2:
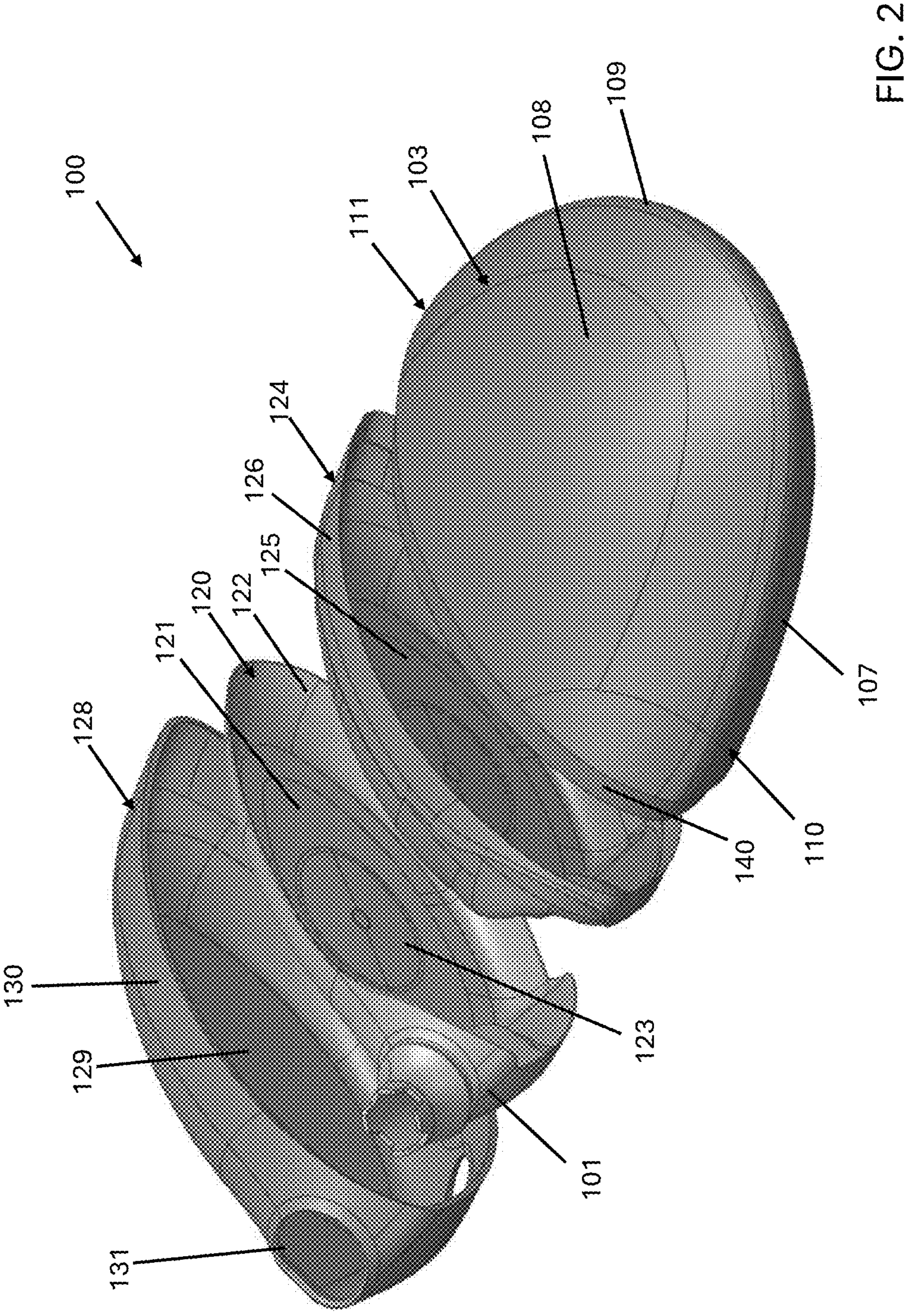
FIG. 2 depicts a partially exploded view of the golf club head of FIG. 1.
Figure 3:
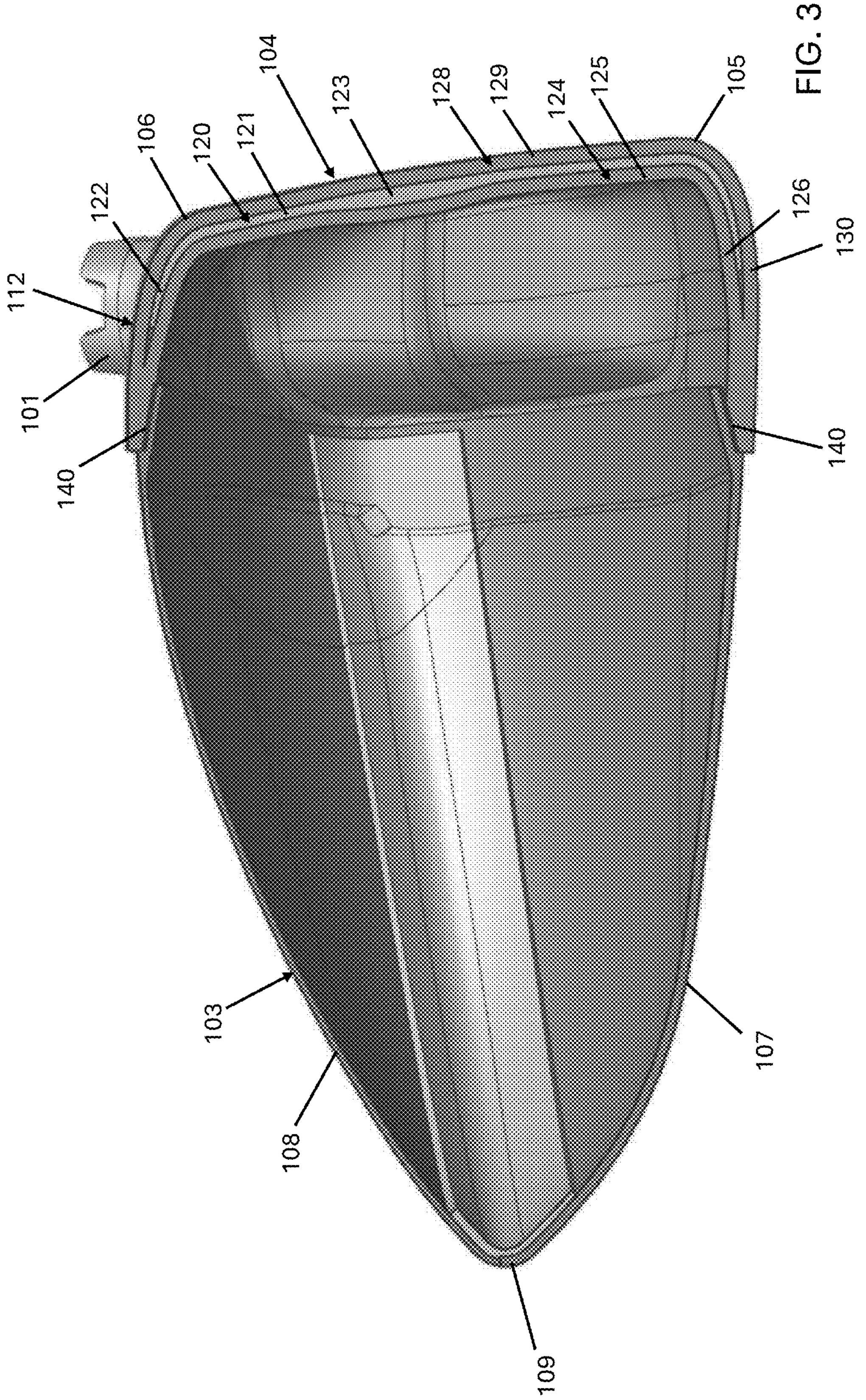
FIG. 3 depicts a toe-to-heel cross-sectional view of the golf club head of FIG. 1 along the line 3'-3' in FIG. 1.

FIG. 1 depicts a heel, top-down perspective view of a golf club head 100 according to some examples of the present disclosure. The golf club head 100 is depicted as a metal-wood type golf club head. In some other examples, the golf club head may be a hybrid type golf club head or a driver. FIG. 2 depicts a partially exploded view of the golf club head 100 of FIG. 1. FIG. 3 depicts a toe-to-heel cross-sectional view of the golf club head 100 of FIG. 1 along the line 3'-3' in FIG. 1.

Referring concurrently to FIGS. 1-3, the golf club head 100 may include a toe 111, a heel 110, a striking face 104 extending between the toe 111 and the heel 110 and having a lower leading edge 105 and an opposite upper topline edge 106, a hosel 101 disposed at the heel 110 and configured to couple to a golf club shaft (not shown), a sole 107 extending rearwardly from the lower leading edge 105, and a crown 108 extending rearwardly from the upper topline edge 106. The striking face 104 may be configured to strike a golf ball.

In the depicted example, the golf club head 100 includes a rearward portion 103 and a forward portion 102 (e.g., a front cup) attached to the rearward portion 103. The forward portion 102 may include the striking face 104 and a return 112 that at least partially circumferentially surrounds the striking face 104 and that extends rearwardly from the striking face 104. In the depicted example, the forward portion 102 also includes the hosel 101, as described in more detail below. In some other examples, the hosel 101 is separate from, and attached to, the forward portion 102, for example, as described in more detail below with reference to FIGS. 6-9. The forward portion 102 (e.g., the return 112 of the forward portion 102) may define a front portion of the sole 107 and a front portion of the crown 108.

In some examples, the rearward portion 103 may have a recessed ledge 140 (e.g., a rabbet) at a front edge of the rearward portion 103, and a rear edge of the forward portion 102 may be attached to the recessed ledge 140 of the rearward portion 103. The ledge 140 can allow the forward portion 102 to be securely attached to the rearward portion 103 such that exterior surfaces of the forward portion 102 and of the rearward portion 103 are generally level (e.g., continuous) with each other. For example, a step between their exterior surfaces may be reduced or eliminated.

Forming the forward portion 102 and the rearward portion 103 separately can reduce the complexity of fabricating the striking face, which may include multiple layers and materials, as explained in more detail below. This can also allow a material for the rearward portion to be selected independently from the materials of the forward portion, compared to when the rearward portion is, for example, cast as a single piece with at least part of the forward portion. However, in some other examples, the rearward portion may be integrally formed (e.g., integrally cast) with at least part of the forward portion.

The forward portion 102 may include a base layer 120, an inner carbon fiber composite layer 124, and an outer carbon fiber composite layer 128. The inner carbon fiber composite layer 124 may be positioned on (e.g., attached to) a rear surface of the base layer 120, and the outer carbon fiber composite layer 128 may be positioned on (e.g., attached to) a front surface of the base layer 120. For example, the base layer 120 may be at least partly between the inner and outer carbon fiber composite layers 124 and 128. The inner carbon fiber composite layer 124 may be positioned between the base layer 120 and the rearward portion 103. In some examples, the outer carbon fiber composite layer 128 may define at least part of an outermost surface of the striking face 104.

The base layer 120 may include (e.g., be) a metal material, such as aluminum or titanium, or any material that can be easily shaped (e.g., machined) to have a variable thickness. In some examples, the base layer 120 may include a polymer, plastic, or composite material. Each of the inner and outer carbon fiber composite layers 124 and 128 may independently include (e.g., be) a carbon fiber material, such as polyacrylonitrile-based (PAN-based) carbon fiber or pitch-based carbon fiber. In some examples, the inner and outer carbon fiber composite layers 124 and 128 include the same material. In some other examples, the inner and outer carbon fiber composite layers 124 and 128 include different carbon fiber composite materials. The carbon fiber composite material of the inner and outer carbon fiber composite layers 124 and 128 may include one or more plies (e.g., a single ply or a plurality of plies) of the carbon fiber material. In some examples, the carbon fiber material of the inner and outer carbon fiber composite layers 124 and 128 may include a single continuous layer.

The base layer 120 may include front portion 121 and a return 122, the inner carbon fiber composite layer 124 may include a front portion 125 and a return 126, and the outer carbon fiber composite layer 128 may include a front portion 129 and a return 130. The front portions 121, 125, and 129 may define at least part of the striking face 104, and the returns 122, 126, and 130 may respectively at least partly circumferentially surround the front portions 121, 125, and 129 and extend rearwardly from the front portions 121, 125, and 129. For example, the returns 122, 126, and 130 may define at least part of the return 112 of the forward portion 102.

The base layer 120 may have a thickness, as measured along a thickness direction normal to the front surface or rear surface of the base layer 120 (or normal to the front surface or rear surface of the striking face 104), that is variable. The thickness of the base layer 120 may be variable over at least the front portion 121. For example, a first thickness of the base layer 120 at a first position on the front portion 121 (e.g., at a first position on the front surface of the front portion 121) may be different from a second thickness of the base layer 120 at a second position on the front portion 121 (e.g., at a second position on the front surface of the front portion 121) that is spaced apart from the first position. The first thickness may be greater than the second thickness, and a ratio of the first thickness to the second thickness may be between 1.25 to 5.0. In some examples, the first thickness is a greatest thickness of the base layer 120 (e.g., of the front portion 121 of the base layer 120) and/or the second thickness is a smallest thickness of the base layer 120 (e.g., of the front portion 121 of the base layer 120). The front portion 121 includes a thick portion 123, which may be positioned at a center (e.g., geometric center) of the striking face 104 and/or of the front portion 121. In some examples, the thick portion 123 protrudes or bulges rearwardly from an adjacent surrounding region of the front portion 121.

The inner carbon fiber composite layer 124 may have a thickness, as measured along a thickness direction normal to the front surface or rear surface of the inner carbon fiber composite layer 124 (or normal to the front surface or rear surface of the striking face 104), that is substantially uniform (e.g., within 10%, 5%, 3%, or 1% of an average thickness) over at least the front portion 125. For example, a first thickness of the inner carbon fiber composite layer 124 at any first position on the front portion 125 (e.g., at any first position on the front surface of the front portion 125) may be substantially the same (e.g., within 10%, 5%, 3%, or 1%) as a second thickness of the inner carbon fiber composite layer 124 at any second position on the front portion 125 (e.g., at any second position on the front surface of the front portion 125) that is spaced apart from the first position.

The outer carbon fiber composite layer 128 may have a thickness, as measured along a thickness direction normal to the front surface or rear surface of the outer carbon fiber composite layer 128 (or normal to the front surface or rear surface of the striking face 104), that is substantially uniform (e.g., within 10%, 5%, 3%, or 1% of an average thickness) over at least the front portion 129. For example, a first thickness of the outer carbon fiber composite layer 128 at any first position on the front portion 129 (e.g., at any first position on the front surface of the front portion 129) may be substantially the same (e.g., within 10%, 5%, 3%, or 1%) as a second thickness of the outer carbon fiber composite layer 128 at any second position on the front portion 129 (e.g., at any second position on the front surface of the front portion 129) that is spaced apart from the first position.

Because the inner and outer carbon fiber composite layers 124 and 128 may have substantially uniform thickness, they can be relatively easy and inexpensive to fabricate compared to if they were fabricated to have a variable thickness. The inner and outer carbon fiber composite layers 124 and 128 may be fabricated without being machined down from a larger piece of carbon fiber composite material and, thus, can also have improved strength and structural integrity compared to if they were machined down to have a variable thickness. Moreover, because the inner and outer carbon fiber composite layers 124 and 128 are attached to the base layer 120, which may have variable thickness and be easily and inexpensively manufactured without jeopardizing its strength and structural integrity, the striking face 104 as a whole can have a variable thickness. Accordingly, a striking face having both a reduced mass (due to the use of carbon fiber composite material) and the improved performance properties associated with a variable thickness can be realized without sacrificing the strength and structural integrity of the striking face or increasing the cost and complexity of manufacturing the striking face.

Using carbon fiber composite in the striking face can also reduce the amount that characteristic time (CT) of the golf club head increases over time as the golf club head is used to hit golf balls. The CT of a golf club head refers to the time that a golf ball stays in contact with the striking face upon impact with the striking face and under certain conditions. The rules of golf require the CT to be less than a certain value. However, as a golf club head is used to hit golf balls, the material properties of a metal striking face can change over time as a result of the repeated impacts, and these changes in material properties can cause the CT to creep up and, eventually, over the limit. However, the material properties of carbon fiber composite change much more slowly than the material properties of most metals. Therefore, including carbon fiber composite in the striking face (instead of pure metal) can reduce the amount by which the CT creeps up and the risk of the golf club head becoming illegal if the CT limit is surpassed.

The striking face 104 may have a thickness, as measured along a thickness direction normal towou the front surface or rear surface of the striking face 104, that is variable. For example, a first thickness of the striking face 104 at a first position on the striking face 104 (e.g., at a first position on the front surface of the striking face 104) may be different from a second thickness of the striking face 104 at a second position on the striking face 104 (e.g., at a second position on the front surface of the striking face 104) that is spaced apart from the first position. The first thickness may be greater than the second thickness, and a ratio of the first thickness to the second thickness may be within a range of 1.05 to 2.0. In some examples, the first thickness is a greatest thickness of the striking face 104 and/or the second thickness is a smallest thickness of the striking face 104. The striking face 104 may include a thick portion, for example, corresponding to the thick portion 123 of the base layer 120.

In some examples, a thickness of the inner carbon fiber composite layer 124 (e.g., of the front portion 125) may be substantially equal (e.g., within 10%, 5%, 3%, or 1% of being equal) to a thickness of the outer carbon fiber composite layer 128 (e.g., of the front portion 129). In some other examples, the thickness of the front portion 125 of the inner carbon fiber composite layer 124 may be different from (e.g., less than or greater than) the thickness of the front portion 129 of the outer carbon fiber composite layer 128. For example, a ratio of the thickness of the front portion 125 of the inner carbon fiber composite layer 124 to the thickness of the front portion 129 of the outer carbon fiber composite layer 128 may be within a range of 0.20 to 5.0, 0.25 to 4.0, 0.33 to 3.0, 0.5 to 2.0, or 0.67 to 1.5.

The inner and outer carbon fiber composite layers 124 and 128 may respectively cover at least part (e.g., at least 70%, 80%, 90% or 100%) of the rear and front surfaces of the front portion 121 of the base layer 120. In some examples, the inner and outer carbon fiber composite layers 124 and 128 may at least partly envelope (e.g., seal) the base layer 120 and may be attached (e.g., bonded) together at their respective returns 126 and 130. For example, the returns 126 and 130 may extend further rearward than the return 122 and may extend beyond the return 122 to make contact with each other. The base layer 120 may overlap with at least part (e.g., at least 40%, 50%, 60%, 70%, 80%, or 90%) of a region (e.g., area) of overlap between the inner and outer carbon fiber composite layers 124 and 128.

In the depicted example, the hosel 101 is integrally formed with the base layer 120. For example, the hosel 101 and the base layer 120 may be formed together from a single material (e.g., a single metal, such as titanium). The material (e.g., metal) of the hosel 101 and of the base layer 120 may be monolithic (or continuous, without having breaks or interfaces in the material between the base layer 120 and the hosel 101).

The inner and outer carbon fiber composite layers 124 and 128 may be shaped and sized to surround (e.g., envelope) at least part of the hosel 101, and the inner and outer carbon fiber composite layers 124 and 128 may be attached (e.g., bonded) to each other around at least part of the hosel 101. The outer carbon fiber composite layer 128 may have an opening 131 shaped and sized for the hosel 101 (e.g., a top portion of the hosel 101) to extend through. The inner and outer carbon fiber composite layers 124 and 128 may cover at least part of the heel 110 and at least part of the toe 111.

Figure 4:
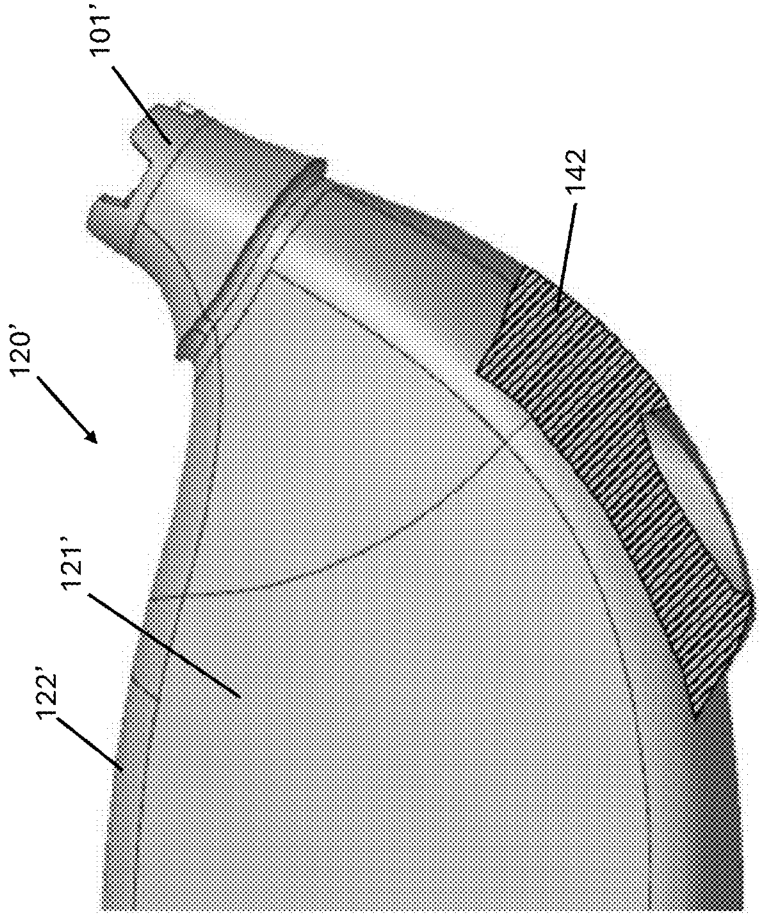
FIG. 4 depicts a front view of a base layer and hosel according to a variant example of the golf club head of FIG. 1.
Figure 5:
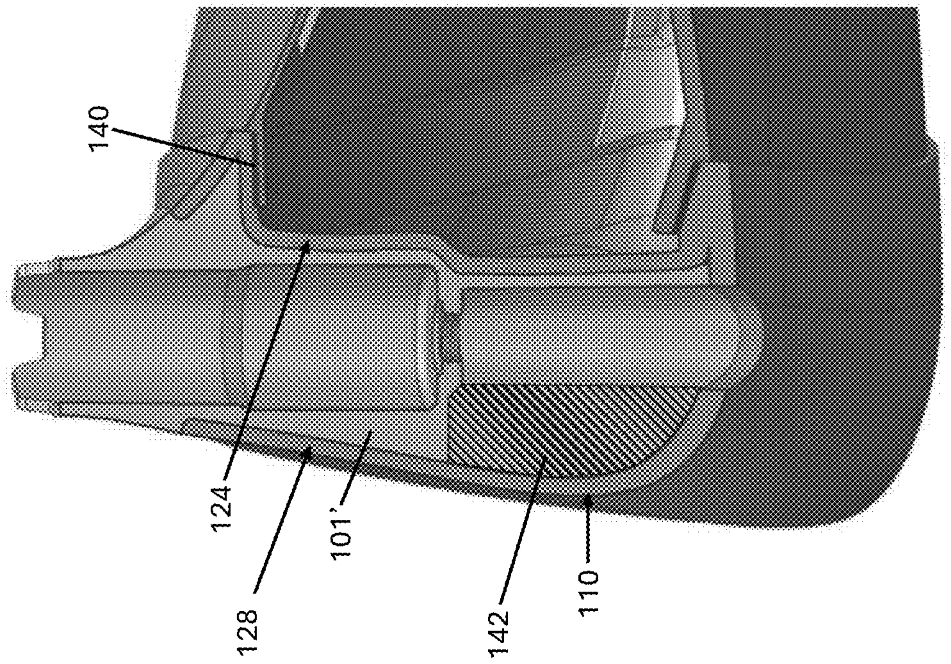
FIG. 5 depicts a heel-to-toe cross-sectional view of part of the variant example of FIG. 4 along the line 5'-5' in FIG. 1.

FIG. 4 depicts a front view of a base layer 120' and of a hosel 101' according to a variant example of the golf club head 100 of FIG. 1. FIG. 5 depicts a heel-to-toe cross-sectional view of part of the variant example of FIG. 4 along the line 5'-5' in FIG. 1. The golf club head of FIGS. 4 and 5 may be similar to the golf club head of FIGS. 1-3, except for differences in the hosel 101' described herein. Therefore, redundant descriptions may not be repeated.

Referring concurrently to FIGS. 4 and 5, the base layer 120' may include a front portion 121' and a return 122', and the base layer 120' may be integrally formed with the hosel 101'. In some other examples, the hosel 101' and the base layer 120' may be separate components, and the hosel 101' may be attached to the forward portion of the golf club head.

The hosel 101' may include a first material, such as titanium, and a low-density component 142 including a second material. The second material may have a lower density than the first material and may include, for example, chopped carbon fiber of bulk molding compound. In some examples, the density of the second material may be less than 80%, 70%, 60%, 50%, 40%, 30%, or 20% of the density of the first material. The low-density component 142 may be positioned proximal to the sole and in an indent (or rabbet) shaped and sized to receive at least part of the low-density component 142. The low-density component 142 may be at least partially covered by one or both of the inner and outer carbon fiber composite layers 124 and 128.

The low-density component 142 may reduce the mass of the hosel 101' compared to if the hosel 101' is formed entirely of the heavier first material. This can reduce the total mass of the golf club head and/or allow for mass to be strategically positioned elsewhere in the golf club head to selectively improve certain performance characteristics of the golf club head.

Figure 6:
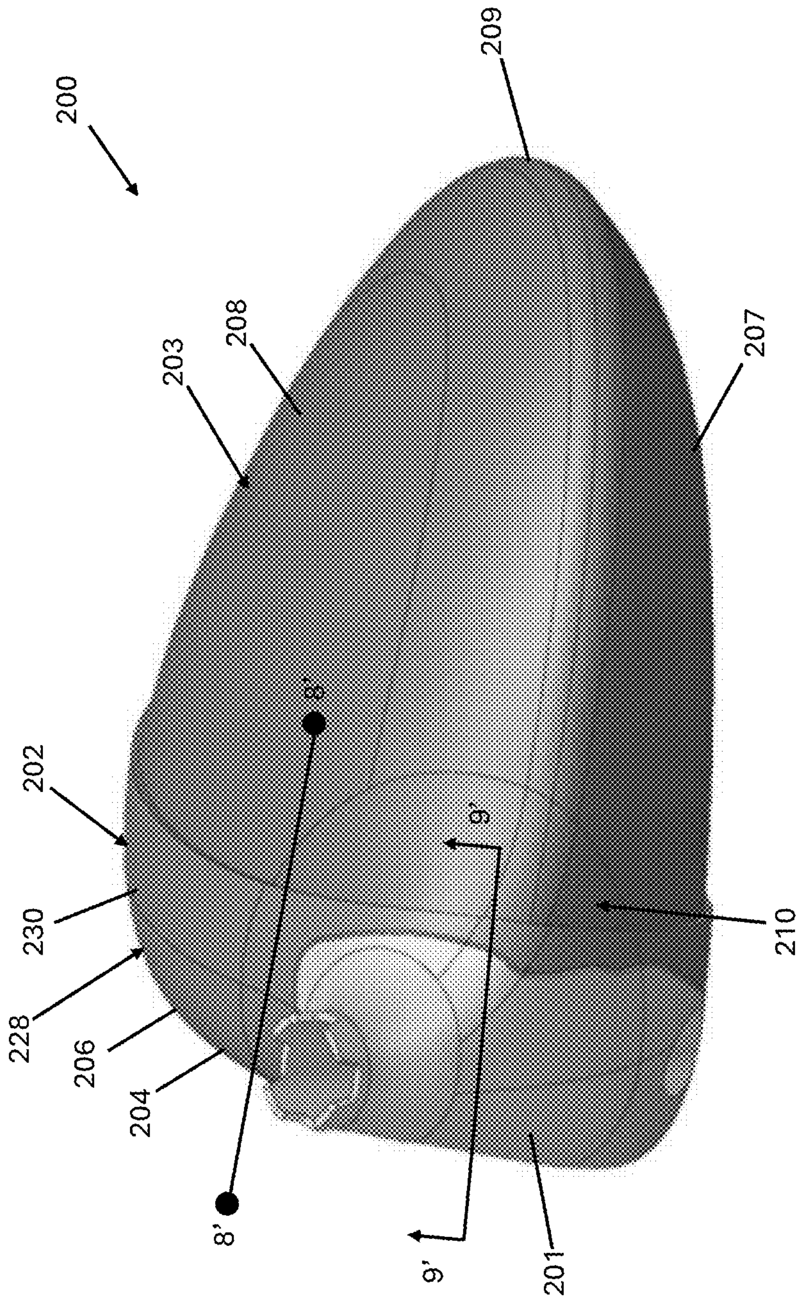
FIG. 6 depicts a heel-to-toe perspective view of another golf club head, according to some examples.
Figure 7:
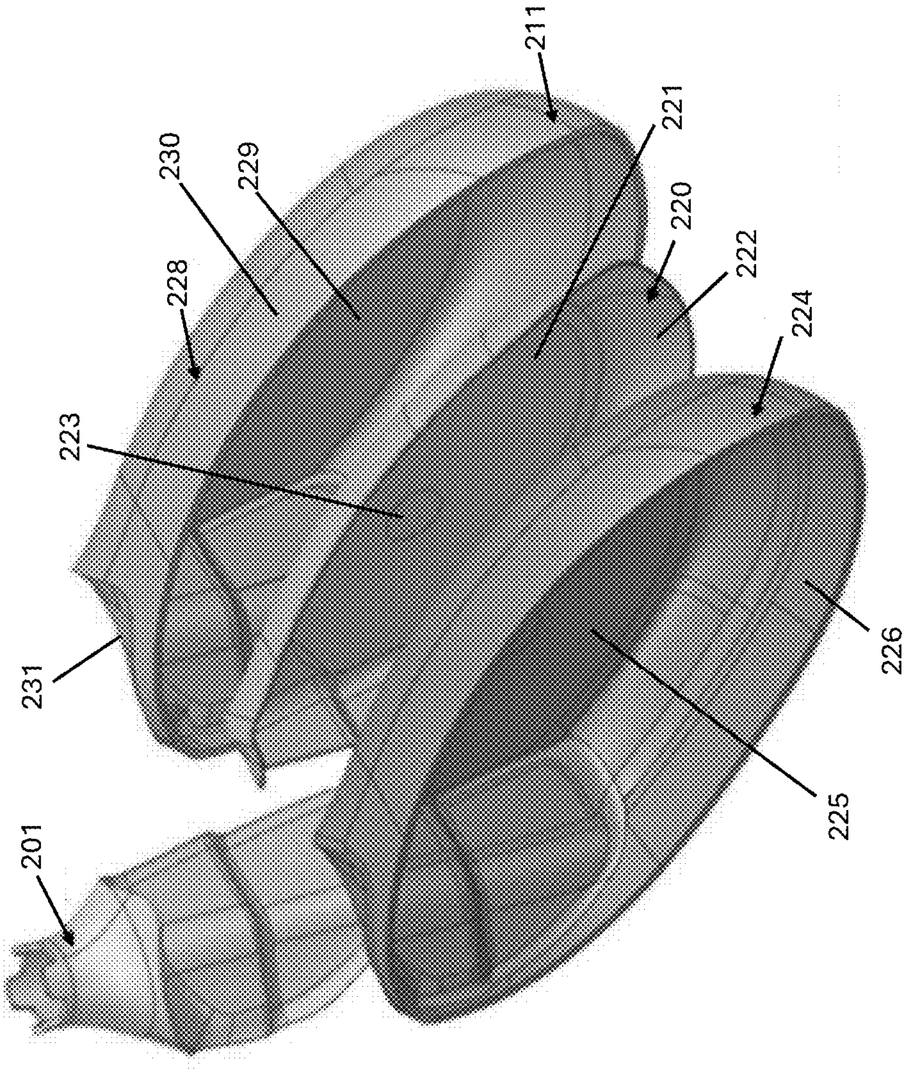
FIG. 7 depicts a partially exploded view of the hosel and front portion of the golf club head of FIG. 6.
Figure 8:
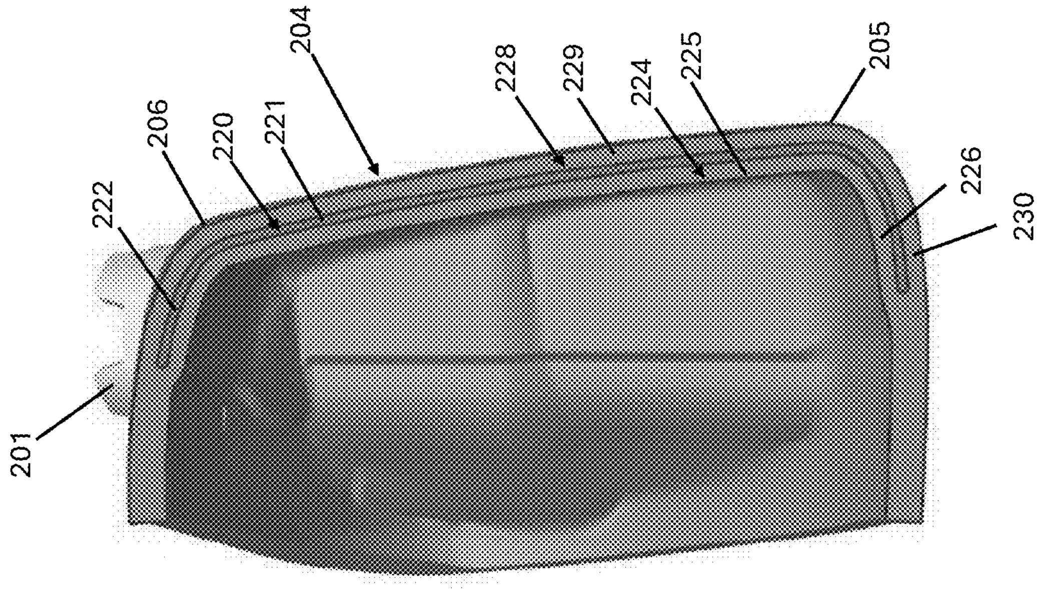
FIG. 8 depicts a toe-to-heel cross-sectional view of the front portion of the golf club head of FIG. 6 along the line 8'-8' in FIG. 6.
Figure 9:
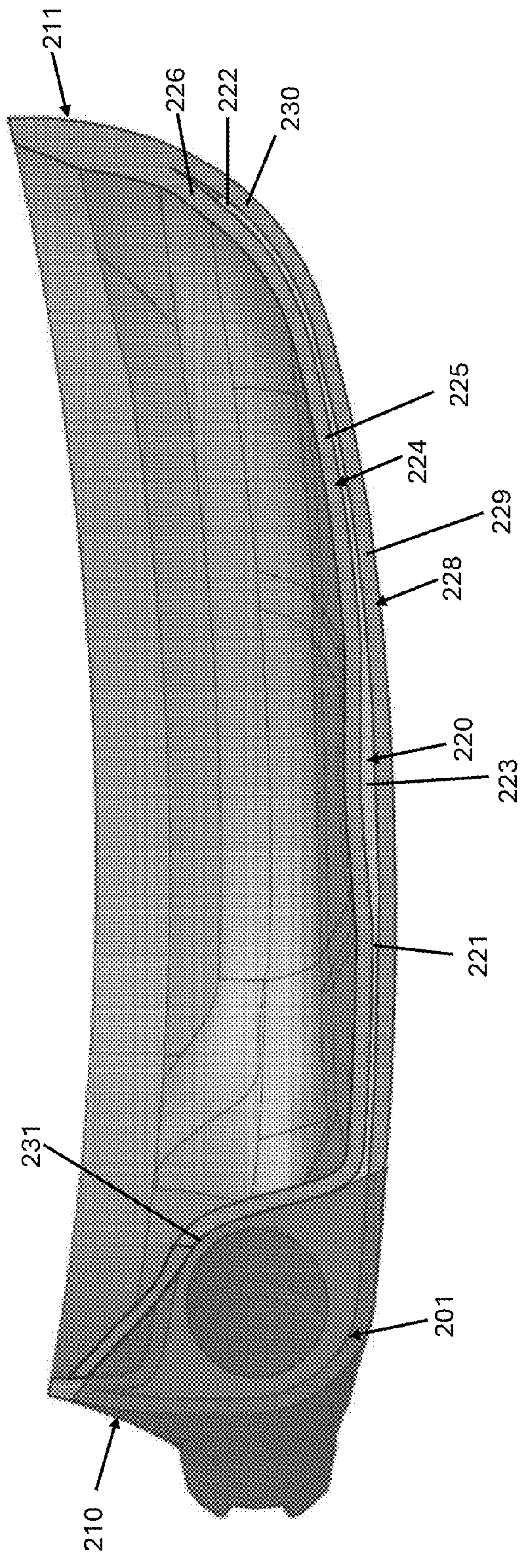
FIG. 9 depicts a bottom-up cross-sectional view of the front portion of the golf club head of FIG. 6 along the line 9'-9' in FIG. 6.

FIG. 6 depicts a heel-to-toe perspective view of another golf club head 200, according to some examples. The golf club head 200 is depicted as a metalwood golf club head. In some examples, the golf club head may be a driver or a hybrid golf club head. FIG. 7 depicts a partially exploded view of the hosel 201 and forward portion 202 of the golf club head of FIG. 6. FIG. 8 depicts a toe-to-heel cross-sectional view of the forward portion 202 of the golf club head 200 of FIG. 6 along the line 8'-8' in FIG. 6. FIG. 9 depicts a bottom-up cross-sectional view of the forward portion 202 of the golf club head 200 of FIG. 6 along the line 9'-9' in FIG. 6. The golf club head 200 may include features similar to, or the same as, features of other golf club heads within the scope of the present disclosure, including, without limitation, the golf club head 100. Therefore, redundant descriptions may not be repeated.

The golf club head 200 may include a hosel 201, a heel 210, a toe 211, a striking face 204 configured to strike a golf ball and having a lower leading edge 205 and an opposite upper topline edge 206, a sole 207 extending rearward from the lower leading edge 205, a crown 208 extending rearward from the upper topline edge 206 and being joined to the sole 207 at a skirt 209, a rearward portion 203, and a forward portion 202 attached to the rearward portion 203. The rearward portion 203 and the forward portion 202 may have features similar to, or the same as, features of other rearward and forward portions described herein, including, without limitation, the rearward portion 103 and the forward portion 102 of the golf club head 100.

The forward portion 202 may include a base layer 220, an inner carbon fiber composite layer 224 on an inner surface of the base layer 220, and an outer carbon fiber composite layer 228 on an opposite outer surface of the base layer 220. The base layer 220 may include a front portion 221 and a return 222, and the base layer 220 may have a variable thickness over at least the front portion 221. For example, the front portion 221 may include a thick portion 223 overlapping, or proximal to, a center of the front portion 221 and/or of the striking face 204. The inner carbon fiber composite layer 224 may include a front portion 225 and a return 226. The outer carbon fiber composite layer 228 may include a front portion 229 and a return 230. The inner and outer carbon fiber composite layers 224 and 228 may each have substantially uniform thicknesses.

In the depicted example, the hosel 201 and the base layer 220 are separate components that are coupled together. The hosel 201 may include (e.g., be) a first material (e.g., titanium), and the base layer 220 may include (e.g., be) a second material (e.g., aluminum) different from the first material. The second material of the base layer 220 may have a lower density than the first material of the hosel 201. By forming the hosel 201 and the base layer 220 separately, the hosel 201 and the base layer 220 may include two different materials (e.g., the first and second materials), and this can allow for the weight of the striking face 204 to be reduced, which can allow the total weight of the golf club head 200 to be reduced and/or for material to be strategically positioned elsewhere in the golf club head 200 to selectively improve certain performance characteristics of the golf club head 200. The manufacturing complexity can also be reduced by forming the hosel 201 and the base layer 220 separately compared to trying to fabricate these two components as a single, integral structure.

The hosel 201 may be attached to the forward portion 202, for example, by an adhesive (e.g., glue) and/or a fastener. The outer carbon fiber composite layer 228 may have an indent 231 at the heel side of the outer carbon fiber composite layer 228 that is shaped and sized to receive at least part of the hosel 201. In some examples, the hosel 201 may include certain features configured to improve attachment of the hosel 201 to the forward portion 202, such as surface roughness, corrugation, groove(s), ridge(s), texture pattern (s), void(s), and/or tab(s).

Figure 10:
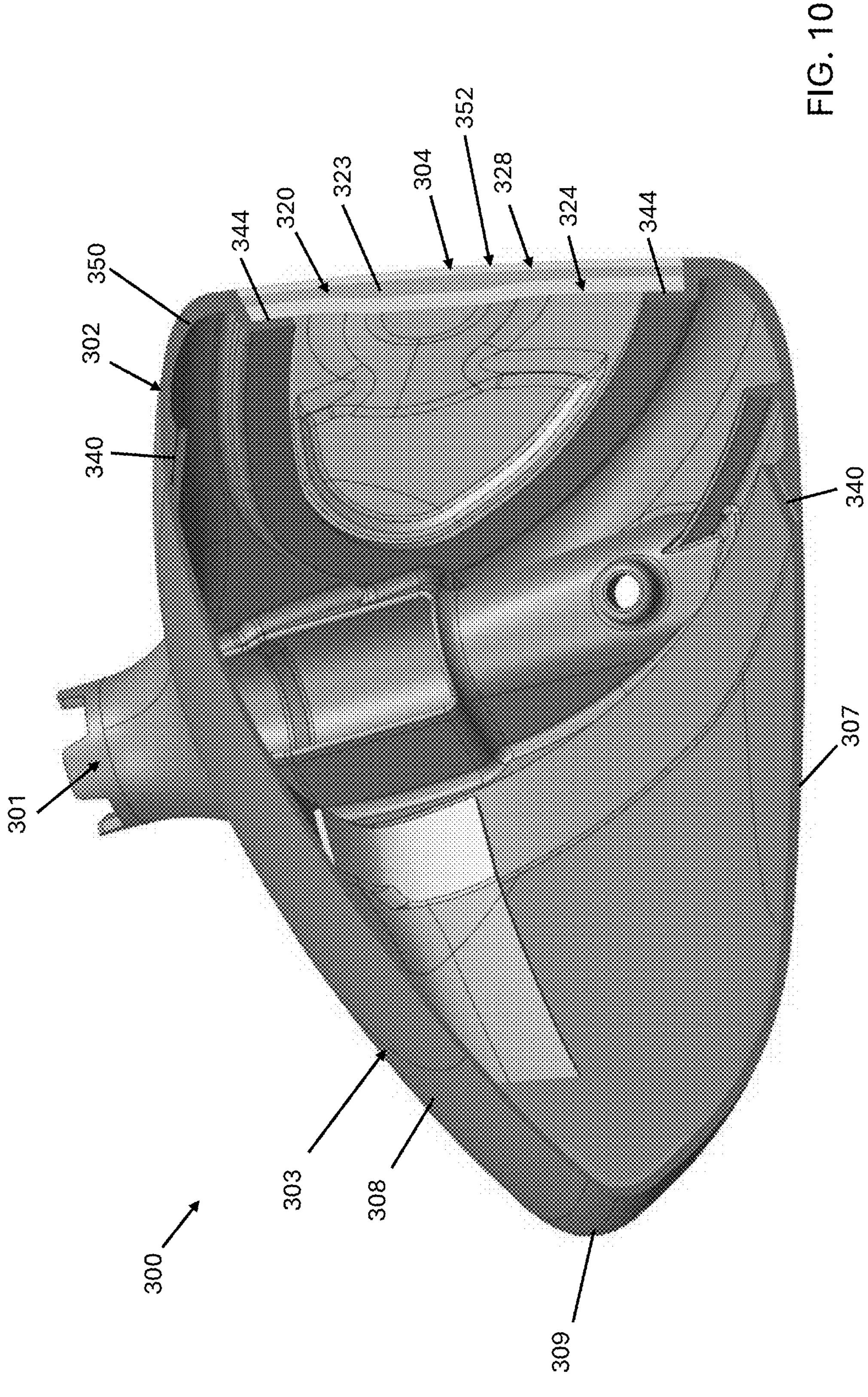
FIG. 10 depicts a toe-to-heel cross-sectional view of another golf club head, according to some examples.

FIG. 10 depicts a toe-to-heel cross-sectional view of another golf club head 300, according to some examples. The golf club head 300 is depicted as a metalwood golf club head. In some examples, the golf club head 300 may be a driver or hybrid type golf club head. The golf club head 300 may include features similar to, or the same as, features of other golf club heads described herein or within the scope of the present disclosure. Therefore, redundant descriptions may be omitted.

The golf club head 300 may include a hosel 301, a heel, a toe, a striking face 304 configured to strike a golf ball and having a lower leading edge and an opposite upper topline edge, a sole 307 extending rearward from the lower leading edge, a crown 308 extending rearward from the upper topline edge and being joined to the sole 307 at a skirt 309, a rearward portion 303, and a forward portion 302 attached to the rearward portion 303. The rearward portion 303 and the forward portion 302 may have some features similar to, or the same as, features of other rearward portions and forward portions described herein, including, without limitation, the rearward portion 103 and the forward portion 102 of the golf club head 100.

The forward portion 302 may include a frame 350 attached to the rearward portion 303. In some examples, the hosel 301 and the frame 350 may be integrally formed, for example, from a single monolithic material (e.g., a single metal).

The frame 350 may have an indented (or recessed) ledge 344, and the ledge 344 may extend around at least part of an opening in the frame 350. The forward portion 302 may also include a striking face insert 352 positioned on the indented ledge 344. In some examples, the striking face insert 352 is attached to the ledge 344 and covers the opening in the frame 350.

The striking face insert 352 may define at least part of the striking face 304. The striking face insert 352 may have variable thickness and may include a carbon fiber composite material. For example, the striking face insert 352 may include a base layer 320, an inner carbon fiber composite layer 324, and an outer carbon fiber composite layer 328. The base layer 320, the inner carbon fiber composite layer 324, and the outer carbon fiber composite layer 328 may respectively have some features similar to, or the same as, features of other base layers, inner carbon fiber composite layers, and outer carbon fiber composite layers described herein, including, without limitation, the base layer 120, the inner carbon fiber composite layer 124, and the outer carbon fiber composite layer 128.

The base layer 320 may include (e.g., be) a metal material, such as titanium or aluminum, and may have a variable thickness. For example, the base layer 320 may have a thick portion 323 overlapping, or proximal to, a center of the front portion 321. The inner carbon fiber composite layer 324 may have a substantially uniform thickness, and the outer carbon fiber composite layer 328 may have a substantially uniform thickness. In the depicted example, the base layer 320 and the inner and outer carbon fiber composite layers 324 and 328 do not include returns, and the forward portion 302 has a return defined by the frame 350.

Figure 11:
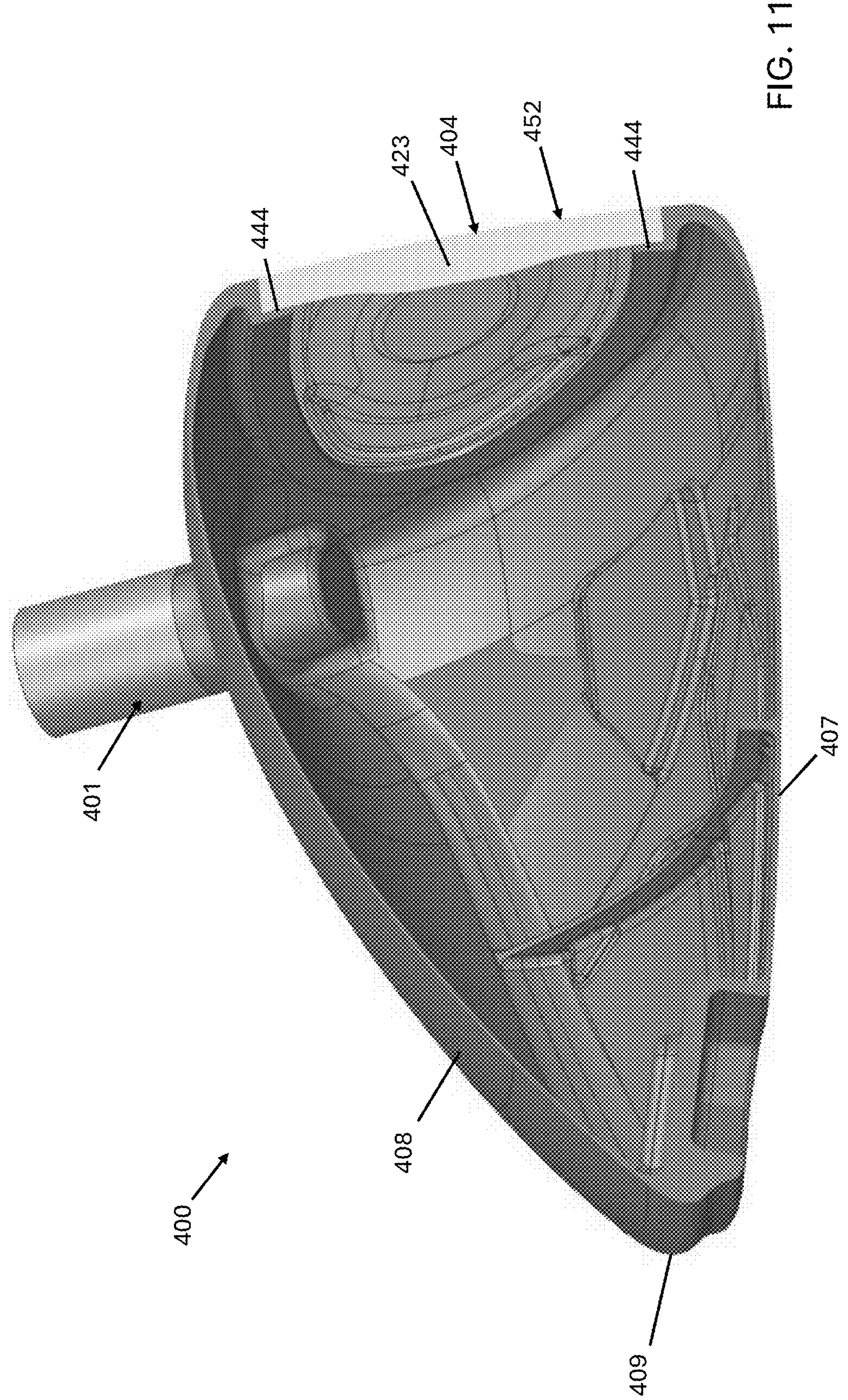
FIG. 11 depicts a toe-to-heel cross-sectional view of another golf club head, according to some examples.

FIG. 11 depicts a toe-to-heel cross-sectional view of another golf club head 400, according to some examples. The golf club head 400 is depicted as a metalwood golf club head. In some examples, the golf club head 400 may be a driver or hybrid type golf club head. The golf club head 400 may include features similar to, or the same as, features of other golf club heads described herein or within the scope of the present disclosure, including, without limitation, the golf club head 300. Therefore, redundant descriptions may be omitted.

The golf club head 400 may include a hosel 401, a heel, a toe, a striking face 404 configured to strike a golf ball and having a lower leading edge and an opposite upper topline edge, a sole 407 extending rearward from the lower leading edge, and a crown 408 extending rearward from the upper topline edge and being joined to the sole 407 at a skirt 409. In the depicted example, a forward portion and a rearward portion of the golf club head 400 are formed as a single, unitary piece. In some other examples, the rearward and forward portions of the golf club head 400 may be separate pieces that are attached together in any manner described herein.

The forward portion may have an indented (or recessed) ledge 444, and the ledge 444 may extend around at least part of an opening in the forward portion. The golf club head may also include a striking face insert 452 positioned on the indented ledge 444. In some examples, the striking face insert 452 is attached to the ledge 444 and covers the opening in the frame 450.

The striking face insert 452 may include a carbon fiber composite material and have a variable thickness. For example, the striking face insert 452 may have a thick portion 423 positioned at, or proximal to, a center of the striking face 404.

In some examples, the striking face insert 452 may include only the carbon fiber composite material. The striking face insert 452 may include a plurality of partially overlapping carbon fiber composite material layers that are bonded (e.g., molded) together to form a single carbon fiber composite material layer having variable thickness along a thickness direction normal to a front surface or a rear surface of the single layer. For example, more fiber composite material layers may mutually overlap a region of the striking face insert 452 (e.g., the region of the thick portion 423) that has a relatively large thickness compared to a region of the striking face insert 452 that has a relatively small thickness. In the depicted example, the thick portion 423 is defined by a generally circular region that is thicker near a center compared to regions closer to the toe, the heel, the lower leading edge, and/or the upper topline edge.

Figure 12:
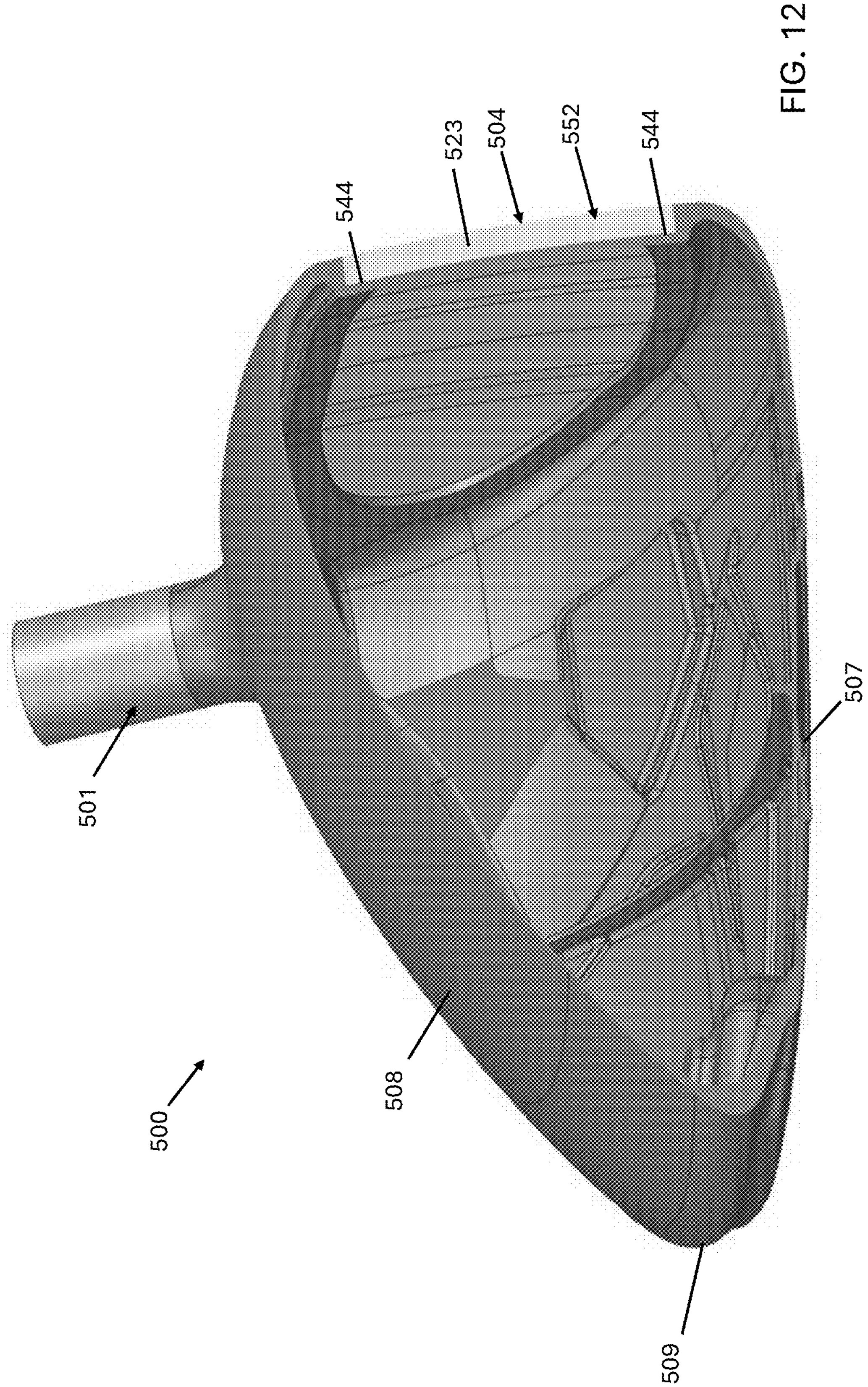
FIG. 12 depicts a toe-to-heel cross-sectional view of another golf club head, according to some examples.

FIG. 12 depicts a toe-to-heel cross-sectional view of another golf club head 500, according to some examples. The golf club head 500 is depicted as a metalwood golf club head. In some examples, the golf club head 500 may be a driver or hybrid type golf club head. The golf club head 500 may include features similar to, or the same as, features of other golf club heads described herein or within the scope of the present disclosure, including, without limitation, the golf club head 400. Therefore, redundant descriptions may not be repeated.

The golf club head 500 may include a hosel 501, a heel, a toe, a striking face 504 configured to strike a golf ball and having a lower leading edge and an opposite upper topline edge, a sole 507 extending rearward from the lower leading edge, and a crown 508 extending rearward from the upper topline edge and being joined to the sole 507 at a skirt 509. The golf club head 500 may have an indented (or recessed) ledge 544, and the golf club head 500 may include a striking face insert 552 positioned on (e.g., attached to) the indented ledge 544.

The striking face insert 552 may include a carbon fiber composite material and have a variable thickness. For example, the striking face insert 552 may have a thick portion 523 positioned at, or proximal to, a center of the striking face 504 and generally extending between a bottom edge of the striking face insert 552 proximal to the lower leading edge to a top edge of the striking face insert 552 proximal to the upper topline edge.

The striking face insert 552 may include a plurality of partially overlapping carbon fiber composite material layers that are bonded (e.g., molded) together to form a single carbon fiber composite material layer having variable thickness along a direction normal to a front surface or rear surface of the single layer. In some examples, more fiber composite material layers may mutually overlap a region of the striking face insert 552 (e.g., the region of the thick portion 523) that has a relatively large thickness compared to a region of the striking face insert 552 that has a relatively small thickness. For example, the thickness of the striking face insert 552 may generally vary along a toe-heel direction and may be substantially uniform (e.g., within 10%, 5%, 3%, or 1% of an average) along a direction from the bottom edge to the top edge of the striking face insert 552.

Although specific embodiments are described herein, the scope of the technology is not limited to those specific embodiments. Moreover, while different examples and embodiments may be described separately, such embodiments and examples may be combined with one another in implementing the technology described herein. For example, features from a first embodiment may be used together with features of a second embodiment. One skilled in the art will recognize other embodiments or improvements that are within the scope and spirit of the present technology. Therefore, the present disclosure is not limited to or by the specific examples disclosed herein. The scope of the technology is defined by the following claims and any equivalents therein.

What is claimed is:

1. A golf club head, comprising:
- a toe;
- a heel;
- a hosel disposed at the heel and configured to couple to a shaft;
- a multi-material striking face, comprising:
  - a first carbon fiber composite layer,
  - a second carbon fiber composite layer, and
  - a base layer between the first and second carbon fiber composite layers and comprising a different material than the first and second carbon fiber composite layers; and
- a sole forming a bottom portion of the golf club head.

2. The golf club head of claim 1, wherein the golf club head is a metalwood type golf club head comprising a crown, and
- wherein the base layer covers at least 50% of an area of overlap between the first and second carbon fiber composite layers.

3. The golf club head of claim 1, wherein a forward portion of the golf club head has an indent with a rearwardly offset ledge, and
- wherein the first carbon fiber composite layer, the second carbon fiber composite layer, and the base layer define at least part of a striking face that is secured within the indent.

4. The golf club head of claim 1, wherein the base layer has a thickness, as measured along a direction normal to a front surface of the base layer, that is variable.

5. The golf club head of claim 4, wherein the first carbon fiber composite layer has a thickness, as measured along a direction normal to a front surface of the first carbon fiber composite layer, that is substantially uniform over the front surface of the first carbon fiber composite layer, and the second carbon fiber composite layer has a thickness, as measured along a direction normal to a front surface of the second carbon fiber composite layer, that is substantially uniform over the front surface of the second carbon fiber composite layer.

6. The golf club head of claim 5, wherein respective thicknesses of the first and second carbon fiber composite layers are substantially equal to each other.

7. The golf club head of claim 1, wherein the first carbon fiber composite layer, the base layer, and the second carbon fiber composite layer define at least part of a front cup that is secured to a rearward portion of the golf club head.

8. The golf club head of claim 7, wherein the first and second carbon fiber composite layers are joined together at a periphery of the base layer.

9. The golf club head of claim 7, wherein the hosel comprises a first metal, the base layer comprises a second metal having a lower density than the first metal, and the hosel is attached to the front cup.

10. The golf club head of claim 1, wherein the base layer and the hosel are monolithic and comprise a same metal material.

11. A golf club head, comprising:
- a toe;
- a heel;
- a hosel disposed at the heel and configured to couple to a shaft;
- a striking face having a thickness, as measured along a direction normal to a front surface of the striking face, that is variable, the striking face comprising:
  - a base layer comprising a metal, and
  - a first carbon fiber composite layer on the base layer and having a thickness, as measured along a direction normal to a front surface of the first carbon fiber composite layer, that is substantially uniform; and
- a sole forming a bottom portion of the golf club head.

12. The golf club head of claim 11, wherein the striking face further comprises a second carbon fiber composite layer on an opposite side of the base layer from the first carbon fiber composite layer.

13. The golf club head of claim 11, wherein the base layer has a thickness, as measured along a direction normal to a front surface of the base layer, that is variable.

14. The golf club head of claim 11, wherein the base layer and the first carbon fiber composite layer define at least part of a front cup that is secured to a rearward portion of the golf club head, the rearward portion defining at least part of the sole.

15. The golf club head of claim 14, wherein the hosel is attached to the front cup by at least one of an adhesive or a fastener.

16. The golf club head of claim 14, wherein the base layer and the hosel comprise a same metal material and are joined to each other.

17. A golf club head, comprising:
- a toe;
- a heel;
- a hosel disposed at the heel and configured to couple to a shaft;
- a multi-material striking face comprising:
  - a base layer having a thickness, as measured along a direction normal to a front surface of the base layer, that is variable, and
  - a first carbon fiber composite layer on a first surface of the base layer, the first carbon fiber composite layer and the base layer being different in material; and
- a sole forming a bottom portion of the golf club head.

18. The golf club head of claim 17, wherein the striking face further comprises a second carbon fiber composite layer on a second surface of the base layer.

19. The golf club head of claim 17, wherein a forward portion of the golf club head has an indent with a ledge rearwardly offset from an outer surface of forward portion, and
- wherein the first carbon fiber composite layer and the base layer define at least part of a striking face insert that is positioned within the indent.

20. The golf club head of claim 17, wherein the hosel comprises a metal body having an indent at a region of the hosel proximal to the sole, and
- wherein the indent in the hosel is filled with a material having a lower density than the metal of the hosel.

* * * * *